No. 664,364. Patented Dec. 18, 1900.
P. G. VAN WIE.
ADJUSTABLE GAS BURNER
(Application filed Nov. 27, 1899.)

(No Model.)

WITNESSES
Chas. E. Wiener
M. E. Kott

INVENTOR
Peter G. Van Wie
By Parker & Burton
Attorneys.

UNITED STATES PATENT OFFICE.

PETER G. VAN WIE, OF DETROIT, MICHIGAN, ASSIGNOR TO THE IDEAL MANUFACTURING COMPANY, OF SAME PLACE.

ADJUSTABLE GAS-BURNER.

SPECIFICATION forming part of Letters Patent No. 664,364, dated December 18, 1900.

Application filed November 27, 1899. Serial No. 738,279. (No model.)

*To all whom it may concern:*

Be it known that I, PETER G. VAN WIE, a citizen of the United States, residing at Detroit, county of Wayne, State of Michigan, have invented a certain new and useful Improvement in Adjustable Gas-Burners; and I declare the following to be a full, clear, and exact description of the invention, such as will enable others skilled in the art to which it pertains to make and use the same, reference being had to the accompanying drawings, which form a part of this specification.

This invention relates to gas-valves, and has for its object an improved valve to be used to admit gas to the mixer in which air and gas are mixed preparatory to burning. The valve of this invention is provided with an adjustable nozzle through which the gas escapes into the mixer and which has an orificial capacity that remains practically constant after being once adjusted, but in which the orificial capacity may be regulated by adjustment between an entirely-closed nozzle and a nozzle which is fully disclosed to the extent of the opening through the nozzle.

Figure 1:
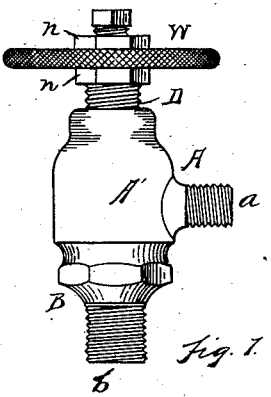
Figure 2:
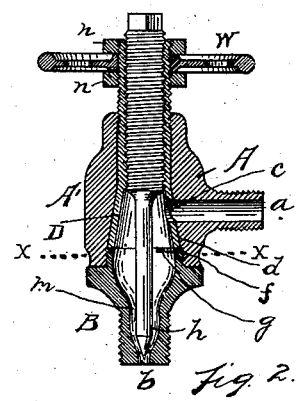
Figure 3:
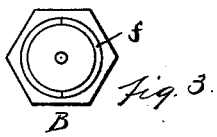

In the drawings, Figure 1 is an elevation. Fig. 2 is a vertical cross-section. Fig. 3 is a horizontal cross-section at $x\,x$ of Fig. 2.

A indicates the main casing, with a perforated threaded inlet-stem $a$ and with an outlet-mouth $b$. Preferably and for structural reasons this casing is made in two parts A' and B, and the nozzle part B is screwed into the main or body part A', and there is on the inside of the casing a conical chamber coned away from the nozzle B, and the walls of this conical chamber form the seat for a valve D. The valve D is partly conical and partly cylindrical, and its conical part is fitted closely into the seat $d$ and its cylindrical parts extend through a cylindrical opening in the case A'. The cylindrical part of the valve is threaded internally for a part or the whole of its distance. The cylindrical part is also threaded externally for that part of its distance which projects beyond the casing A'. At the base of the conical part the valve bears against the end of the nozzle B. For a portion of its circumference the upper edge of the nozzle B is cut away, so that there is for a part of the circumference where the valve D meets the nozzle a slot $f$, and into this slot projects a pin $g$ from the valve D. Through the walls of the valve D is an opening $c$, which can be turned to register with the opening $a$ or can be turned to close the opening $a$. The pin $g$ allows such a turn of the valve to be made. The outlet $b$ from the nozzle part B is a seat for a needle-pointed valve-spindle $h$, and the stem of the needle-valve $h$ is provided with a screw-threaded part, which engages closely through the interior thread of the valve D. The stem projects beyond the projection of the valve D and is furnished at the projecting part with a wrench-hold by means of which the stem of the needle-valve can be adjusted through the valve D and the point of the needle-valve can be adjusted with respect to the outlet-opening $b$ and can be forced to fully close the opening $b$ or drawn back to fully open it. Around the stem of the needle-valve, behind the opening $b$, the chamber in the nozzle expands to allow a free flow of gas to the opening $b$.

A hand-wheel W is secured by jam-nuts $n\,n$ to the protruding part of the valve D.

The outflow-opening $b$ is adjusted in the way previously described. The passage of gas from the inflow-passage $a$ to the outflow-passage $m$ is regulated by turning the valve D in its seat. The valve D should be turned until the passage $a$ is fully disclosed, and the amount of gas admitted to the mixer should be regulated by means of the needle $h$.

What I claim is—

1. In a regulating-valve, the combination of a casing having inlet, outlet and stem passages through the walls thereof, a sleeve-valve D, having its axis in line with the center of one of said passages and being adapted to open and close another of said passages, an end bearing arranged to hold the sleeve-valve D, to its seat, and a rod in said valve coaxial therewith and adapted to be adjusted longitudinally therein, substantially as and for the purpose described.

2. In a regulating-valve, the combination of a casing having inlet, outlet and stem passages through the walls thereof, a sleeve-valve provided with internal screw-threads, having its axis in line with the center of one of said passages, and being adapted to open and close another of said passages, an end bearing arranged to hold the sleeve-valve to its seat, and a screw-threaded rod in said sleeve-valve coaxial therewith, its threads engaging with the threads of said sleeve-valve, and means by which said rod may be rotated relative to said sleeve, substantially as and for the purpose described.

3. In a regulating-valve, the combination of a casing A, having a conical valve-seat therein, a passage through the wall of said casing opening at said valve-seat, a sleeve-valve D, in said casing, the outer end of said sleeve-valve protruding from the casing and being externally screw-threaded, a handle on the outer end of said valve, and means adapted to fix the handle in place upon said valve, substantially as described.

4. In a regulating-valve, the combination of a casing A, having a conical valve-seat therein, a passage through the wall of said casing opening at said valve-seat, a sleeve provided with a conical valve-section and a cylindrical section partly in said casing, and in part protruding therefrom, said conical portion being formed at its inner end to fit said valve-seat and to open and close said passage, said cylindrical section being provided with external screw-threads at its protruding end, a handle on the protruding end of said sleeve, means adapted to fix the handle in place upon said sleeve, a rod centric to the valve-section and adapted to be adjusted longitudinally in reference thereto, said casing being also provided with a passage through its wall in line with the axis of said rod and with a bearing against the end of the valve-section, substantially as and for the purpose described.

5. In a regulating-valve, the combination of a casing A, having a conical valve-seat therein, a passage through the wall of said casing, opening at said valve-seat, a valve provided with a cylindrical sleeve-section partly in said casing and protruding in part therefrom, said sleeve-section being internally screw-threaded and externally screw-threaded at its protruding end, and formed at its inner end with a conical valve-section to fit said valve-seat and to open and close said passage, a handle on the protruding end of said sleeve, means adapted to fix the handle in place upon said sleeve-section, a screw-threaded rod centric to said sleeve-section, its threads engaging with the screw-threads therein, and its upper end extending beyond said sleeve-section and being provided with a wrench-hold, said casing being also provided with a passage through its wall in line with the axis of said rod, substantially as and for the purpose described.

In testimony whereof I sign this specification in the presence of two witnesses.

PETER G. VAN WIE.

Witnesses:
JOHN N. GOODRICH,
M. E. KOTT.